Figure 1:
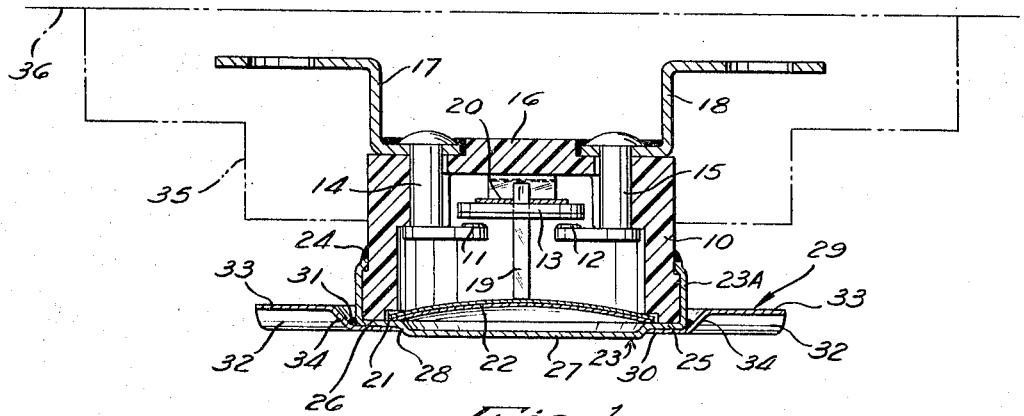

Jan. 10, 1967    C. S. MERTLER    3,297,845
FIRE-DETECTING THERMOSTAT
Filed Jan. 21, 1965

INVENTOR.
CHARLES S. MERTLER
BY Woodling, Krost,
Granger and Rust
ATTORNEYS

United States Patent Office 3,297,845
Patented Jan. 10, 1967

3,297,845
FIRE-DETECTING THERMOSTAT
Charles S. Mertler, Mansfield, Ohio, assignor to Stevens Manufacturing Company, Inc., a corporation of Ohio
Filed Jan. 21, 1965, Ser. No. 426,987
2 Claims. (Cl. 200—138)

This invention relates to a fire-detecting thermostat.

The invention may be incorporated in a thermostat which has switch means and a heat sensitive bimetallic element in one end of a housing for operating the switch means, with the improvement comprising a heat collector of high heat conductivity material attached to said one end of the housing, said heat collector comprising an end wall extending across the outside of said bimetallic element in heat transmitting relationship therewith, and a lateral extension projecting from said end wall laterally beyond the housing throughout a substantial peripheral extent of the housing at said one end of the housing to provide increased surface area exposed to an external heat source.

Prior to the present invention, various fire-detecting thermostats have been proposed in which a switch is operated by a heat-sensitive, snap-acting bimetallic disc. Preferably, the bimetallic disc and the switch should be completely enclosed to seal out lint, dust or other foreign matter which might interfere with the proper operation of the thermostat. However, in such prior thermostats the complete enclosing of the bimetallic disc and switch reduced its thermal sensitivity to an objectionable extent and, where a fast thermal response was mandatory, it was necessary to expose the bimetallic disc, and this was undesirable because the thermostat was no longer completely sealed.

The present invention is directed to a novel fire-detecting thermostat having the bimetallic disc completely enclosed, along with the switch which it operates, but also having a greatly improved thermal response over previous fully-enclosed thermostats. In accordance with the present invention, the thermostat is provided with a novel heat collector of high conductivity metal which is exposed at the end of the thermostat where the bimetallic disc is located. This heat collector projects laterally beyond the thermostat housing to provide an increased surface area exposed to the external heat, thereby enhancing the thermal response of the thermostat without the necessity of exposing the bimetallic disc. Preferably, the laterally projecting part of the heat collector is formed with convolutions which increase its structural rigidity, as well as increasing its surface area exposed to external heat.

It is, therefore, a principal object of this invention to provide a fire-detecting thermostat having a novel and improved heat collector which is exposed to external heat.

Another object of this invention is to provide a novel and improved fire-detecting thermostat of the fully enclosed type which has an improved thermal response.

Further objects and advantages of this invention will be apparent from the following detailed description of a presently-preferred embodiment thereof, which is illustrated in the accompanying drawing.

Figure 2:
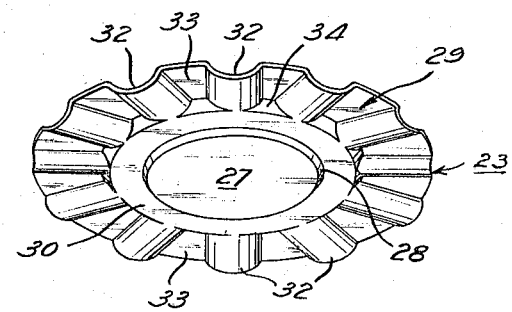

In the drawing:

FIGURE 1 is an axial section through a ceiling-mounted thermostat in accordance with the present invention; and FIGURE 2 is a bottom perspective view of the novel heat collector on this thermostat.

Referring first to FIGURE 1, the thermostat itself may be of known construction, comprising an annular housing 10 of suitable insulation material, a pair of laterally spaced, fixed switch contacts 11 and 12 inside the housing, and a mobile switch contact 13 adapted to bridge the fixed contacts. The fixed contacts are connected to respective rivets 14 and 15 which extend through the top end wall 16 of the housing. Terminals 17 and 18 are connected to the rivets at the outside of the housing.

An operating button 19 of suitable insulation material is connected to the mobile switch contact 13, projecting downward from the latter between the fixed contacts 11 and 12. A bowed spring 20 is engaged between the top end wall 16 of the housing and the mobile contact 13, and it biases the mobile contact downward for bridging engagement with the fixed contacts 11 and 12 to close the circuit between the switch terminals 17 and 18.

At its lower end the switch housing 10 presents a shallow counterbore 21 which receives the periphery of a heat-sensitive bimetallic element, shown as a snap-acting, bimetallic disc 22. As shown in FIGURE 1, this bimetallic disc extends across the open lower end of the housing 10. When the temperature of this disc is below a predetermined critical level it is bowed upwardly at the middle, as shown in FIGURE 1, engaging the lower end of the operating button 19 to hold the mobile contact 13 upward out of engagement with the fixed contacts 11 and 12. However, when the temperature of disc 22 exceeds this critical value, it snaps over to a downwardly bowed position, permitting the mobile contact 13 to move downward under the urging of spring 20 into engagement with the fixed contacts 11 and 12.

In accordance with the present invention, this thermostat is sealed at its lower end by a novel heat collector 23 of high heat conductivity metal which is in conductive heat-transmitting relationship to the bimetallic disc 22. This heat collector 23 comprises an upstanding annular side wall 23A which snugly engages the outside of the switch housing 10 at the latter's lower end. The upper end of this side wall 23A is secured by crimping and by adhesive 24 to the outside of the switch housing 10.

The heat collector 23 has a generally flat end wall which is shown as being integral with its side wall 23A and extends across the lower end of the switch housing 10 and the bimetallic disc 22. This end wall includes a flat annular marginal rim 25, which is connected at its outer edge integrally to the lower end of the side wall 23A and extends radially inwardly therefrom in direct contact with the annular bottom edge 26 of the housing 10 just outside of the latter's counterbore 21. The bimetallic disc 22 rests at its periphery on this marginal rim 25 of the heat collector end wall, so that heat is conducted directly from this heat collector 23 to the bimetallic disc. This end wall also has a flat, circular, central portion 27 disposed slightly below its marginal rim 25 and connected to the latter by an upwardly and outwardly inclined annular connecting segment 28. The downward offset of the central portion 27 of the heat collector permits the bimetallic disc to bow downwardly at the middle when heated.

In accordance with the present invention, the heat sensitivity of this heat collector 23 is enhanced by the provision on it of a lateral extension, which provides more surface area exposed to the external heat. Preferably, as shown in FIGURES 1 and 2, this lateral extension is constituted by an annular piece 29 which projects laterally or radially a substantial distance beyond the annular side wall 23A of the heat collector around the latter's complete extent. This annular extension piece 29 has a flat annular inner peripheral portion 30 which directly engages the bottom face of the outer rim portion 25 of the heat collector end wall. This inner peripheral portion 30 may be integral with the central portion 27 or as shown may be soldered at 31 to this rim portion 25 and the annular side wall 23A of the heat collector.

Laterally beyond this solder connection the annular extension piece 29 has been stretched or drawn out of the nominal plane thereof to present a plurality of convolutions constituted by alternate rounded segments 32 and flat segments 33 in succession circumferentially around the heat collector. The flat segments 33 are disposed slightly above the plane of the inner peripheral portion 30, as shown in FIGURE 1, and are integrally connected to the latter by inclined connecting segments 34, which are disposed between the radially inward ends of the adjacent rounded segments 32, as shown in FIGURE 2. Each rounded segment 32 has its radially inward end joined directly to the inner peripheral portion 30 of this extension piece, and the bottom of each rounded segment 32 is coplanar with this inner peripheral portion 30, as shown in FIGURE 1.

From FIGURE 1 it will be apparent that the lateral extension piece 29 of the heat collector 23 is substantially coplanar with its end wall 25, 27, 28. The convolutions in this lateral extension piece increase its structural rigidity and also increase its surface area exposed to external heat.

Preferably, the entire heat collector is of brass.

In the operation of this thermostat, the high heat conductivity the heat collector 23 enables it to quickly assume the same temperature as the ambient temperature where it is located. Its lateral extension piece 29 provides increased surface area exposed on both sides to this ambient temperature so that it will heat up quickly in the event of a fire nearby. This increased heat will be transmitted conductively to the bimetallic disc 22 to close the switch contacts for signalling a fire alarm or operating a sprinkler.

The entire thermostat may be mounted at the ceiling 36 of a room to be protected, with a plastic housing 35, indicated in phantom in FIGURE 1, closely surrounding its upper end. The fact that the heat collector 23 is spaced from the plastic housing 35 prevents the housing acting as a heat sink. The side wall 23A has only a minimal contact with the insulating housing 10, thus preventing this housing 10 from acting as a heat sink, and accordingly increasing the rapidity with which the thermostat heat collector 23 will be heated. Also this lateral extension 29 exposes both upper and lower faces of the heat collector 23 to enable this heat collector to be heated from both sides to rapidly be heated upon increased air temperature being received. The mass of the plastic housing 35 need not be heated before the collector collects enough heat to cause the bimetal 22 to snap over. This means that the thermostat is considerably faster acting for a given temperature rise in a given length of time. By virtue of the present heat collector 23 on the thermostat the Underwriter Laboratories' requirements have been satisfied by providing such ceiling-mounted thermostats of one inch diameter heat collector 23 spaced thirty feet apart, whereas previously it was necessary to provide fully-enclosed thermostats twenty feet apart to meet these same requirements.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination with a rapid acting thermostat having an annular insulating housing, switch means in said housing, and a heat-sensitive snap-acting bimetallic disc extending across one end of the housing,
   a heat collector of high heat conductivity metal comprising an annular side wall snugly receiving said end of the housing,
   a generally flat end wall extending across the outside of said bimetallic disc in engaging heat-transmitting relationship therewith,
   said end wall and said side wall being integral and completely enclosing the bimetallic disc in the housing to make the housing dust tight,
   and an annular extension attached to said end wall and projecting substantially coplanar therewith laterally a substantial distance beyond said side wall throughout substantially the entire annular extent of said side wall, said annular extension having a plurality of convolutions in succession around its circumference which enhance its structural rigidity and provide increased surface area exposed on both sides to the ambient air.

2. In combination with a rapid acting thermostat having an annular housing of electrical insulating material, the housing having an annular insulating wall surrounding a recess,
   switch means in the housing,
   and a heat sensitive bimetallic disc extending across the recess and engaging the annular wall of the housing,
   a heat collector of high heat conductivity metal comprising,
   an annular side wall snugly receiving and enclosing the annular wall of the housing,
   a generally flat end wall integral with said annular side wall extending across the outside of said bimetallic disc and in engaging heat-transmitting relationship therewith,
   said flat end wall and said annular side wall of said heat collector completely enclosing the recess in the housing to make same dust tight,
   an annular extension integral with said end wall and projecting substantially coplanar therewith laterally a substantial distance beyond said side wall throughout substantially the entire annular extent of said side wall,
   and said annular extension being integral with said flat end wall and said annular side wall for good heat transmission and having a plurality of convolutions in succession around the circumference thereof to enhance the structural rigidity and provide increased surface area exposed on both sides to the ambient air.

References Cited by the Examiner

UNITED STATES PATENTS

| 2,273,375 | 2/1942 | Ray | 200—138 X |
| 2,752,454 | 6/1956 | Kurtz | 200—138 |
| 2,907,851 | 10/1959 | Moorehead et al. | 200—138 |

BERNARD A. GILHEANY, *Primary Examiner*,

T. MACBLAIN, *Assistant Examiner*,